United States Patent [19]

Rabkin et al.

[11] 4,382,169

[45] May 3, 1983

[54] WELD DEPOSITION OF METAL OTHER THAN ALUMINIUM ONTO ALUMINIUM-BASE ALLOY

[76] Inventors: Daniil M. Rabkin, ulitsa Leonida Pervomaiskogo, 3, kv. 21; Vladimir R. Ryabov, prospekt Malinovskogo, 25, kv. 114; Vsevolod N. Bernadsky, ulitsa Anri Barbjusa, 22/26, kv. 15; Anatoly D. Stretovich, ulitsa Parkhomenko, 26, kv. 89; Vladimir A. Kirpaty, ulitsa Leonida Pervomaiskogo, 3, kv. 6, all of Kiev; Ivan A. Koval, ulitsa Girshmana, 18, kv. 5, Kharkov; Valery F. Zlobin, ulitsa Engelsa, 26, kv. 35, Kiev; Arkady B. Menaker, ulitsa Malyshko, 37, kv. 53, Kiev; Yakov I. Sherman, ulitsa Scherbakova, 45, kv. 8, Kiev; Nikolai N. Meleshko, ulitsa Koroleva, 6, kv. 52, Kiev; Alexandr N. Shalai, ulitsa Korolevas, 6a, kv. 31, Kiev, all of U.S.S.R.

[21] Appl. No.: 247,212

[22] Filed: Mar. 24, 1981

[51] Int. Cl.$^3$ ............................................. B23K 9/04
[52] U.S. Cl. ............................ 219/76.1; 219/76.14; 219/76.15; 219/76.16
[58] Field of Search ............... 219/76.1, 76.14, 76.16, 219/76.15

[56] References Cited

U.S. PATENT DOCUMENTS 3,947,607  3/1976  Gazzard ........................... 219/76.15

Primary Examiner—Elliot A. Goldberg
Attorney, Agent, or Firm—Fleit, Jacobson & Cohn

[57] ABSTRACT

A method of depositing a layer of a metal other than aluminium onto an aluminium-base alloy with the use of surfacing material based on alloying element, wherein the deposition process is conducted at a heat output of the heat source of from $10^3$ to $10^5$ W per sq cm and the surfacing material being added to the welding pool in an amount of from 20 to 98% by weight, whereafter the metal thus deposited is remelted, with the weld pool volume being increased 1.2–10.0 times each time when the deposited metal is remelted.

5 Claims, No Drawings

WELD DEPOSITION OF METAL OTHER THAN ALUMINIUM ONTO ALUMINIUM-BASE ALLOY

BACKGROUND OF THE INVENTION

1. Field of the Invention

The present invention relates to the art of welding, and is particularly concerned with a method of depositing a metal other than aluminium onto aluminium-base alloy.

The invention is particularly useful in the manufacture of internal combustion engines for transport vehicles, aircraft and marine engines, and stationary engines, as well as in the aircraft industry and rocket building.

Aluminium-base alloys are used in all the above-mentioned industries. An ever increasing power of such engines requires that alloys used in the manufacture thereof have a correspondingly higher resistance. One of the additional requirements that the engine parts and assemblies which are designed to take up high loads and at the same time are subjected to impact loads at elevated temperatures, must meet is a wear resistance. However, to further improve the wear resistance of parts made from aluminium alloys to meet given operating conditions, it becomes necessary to increase the content of the alloying elements to an extent that will not allow such parts to be manufactured by applying conventional methods such as casting, forging, and stamping. In this respect the deposition of a layer of a metal having a higher wear resistance seems to be the most suitable method of strengthening such parts. However, the scope of practising of the welding techniques with respect to welding aluminium alloys are also limited since adding great amounts of alloying elements to the metal being deposited is not possible to accomplish by applying known in the art processes.

2. Prior Art

There is known a method of depositing a layer of a metal other than aluminium onto aluminium-base alloy with the use of a composite aluminium wire reinforced with fine (0.2 mm) nickel filaments (cf. N. D. Nikitin, A. N. Shalai, Ju. A. Vasiliev "Ispytanie aluminievyh porshney dizeley s iznosostoikoy naplavkoi", M., NIIInformtiyzhmash, 1977).

The above method, however, does not ensure a uniform distribution of nickel in the layer being deposited, which affects the wear resistance of the resulting product. Furthermore, it has a low efficiency; speed of deposition does not exceed 16-20 m per hr. In addition, to apply this method the articles being treated have to be preliminarily heated to a temperature of 200° C., which makes more difficult handling hot articles and requires additional equipment. It should also be noted that the process of manufacturing composite wire is a rather complicated one and is carried out at present only under laboratory conditions, which makes the final product too costly.

The principal object of the present invention is to provide a method of depositing a metal other than aluminium onto aluminium-base alloy, which allows the operating characteristics of parts made from aluminium-base alloys to be improved.

Another object of the invention is to widen the alloying range aluminium-base alloys.

Still another object of the invention is to provide saving alloying elements which are in short supply, such as nickel and cobalt.

A further object of the invention is to provide a higher efficiency of the process of depositing a metal other than aluminium onto aluminium-base alloys and simultaneously improve the quality of the resulting metal deposit.

Other objects and the advantages of the present invention will become apparent from the reading of the attached specification.

SUMMARY OF THE INVENTION

These and other objects of the invention are attained in that in a method of depositing a metal other than aluminium onto aluminium-base alloy with the use of a surfacing material based on alloying element, according to the invention the deposition of metal is effected at a heat output of the heat source of from $10^3$ to $10^5$ W per sq cm and the surfacing material is added to the weld pool in an amount of from 20 to 98 weight percent, whereafter the deposited metal is remelted, with the volume of the weld pool being increased 1.2 to 10.0 times, each time when the deposited metal is remelted.

The main distinguishing feature of the proposed method is the use of a surfacing material based on alloying elements including those whose melting point is higher than that of the aluminium. These elements are iron, nickel, cobalt, manganese and chromium.

While adding said material to the weld pool it is expedient to divide the process into several steps. At the beginning the amount of alloying element should constitute 20-98% of the weld pool weight. A uniform distribution of the surfacing material through the whole volume of the welding pool can be achieved by using a more concentrated heating source in comparison with that which is normally used to form a weld pool of the same volume.

In particular, in the case of an electric arc welding the welding current is increased 1.5-3 times with the welding speed being simultaneously increased 3-10 times. (Any disturbances in the formation of the weld seam such as undercuttings etc., which may occur during the process is burnished later in the course of operation). In case the amount of alloying elements in the surfacing material constitutes 20% it will be sufficient to increase the welding current 1.5 times and the welding speed 3 times, whereas with the amount of the alloying elements constituting 98% the current and the speed of deposition should be increased 3 and 10 times respectively. It is to be noted, however, that the parameters of metal deposition are increased only at that step of the process at which the surfacing material is added to the weld pool. The subsequent remelting that follows is continued without addition of the surfacing material and therefore at this step normal parameters are used. As used herein the term "normal parameters" means such parameters as for example: a metal layer 5 mm thick is deposited with a current of 250-300 A and the speed of deposition of 16-20 m per hr.

While remelting the metal deposited at the first step of the process the volume of the welding pool is increased 1.2-10.0 times which is necessary for providing a uniform distribution of alloying elements.

The proposed method of deposition improves wear-resistance, heat-resistance and other operating characteristics of the machine parts subjected to a local loads at elevated temperatures, which makes it possible to improve technical-and-economic indices of, for example, internal combustion engines at the expense of a greater extent to which the engine power can be augmented, to increase their service life 1.5 to 2.0 times, to save such elements as nickel and cobalt which are in short supply and which are commonly used to improve operating characteristics of aluminium-base alloys.

DETAILED DESCRIPTION OF THE INVENTION

The invention will now be explained with reference to the specific examples of embodiment thereof.

EXAMPLE 1

The proposed method was carried out in the following manner.

A wear-resistant layer was deposited in the zone of the first compression ring of an internal combustion engine piston, with the ring diameter being 110 mm. The said piston was made of casting aluminium-base alloy comprising, by weight, 12.1% of silicon, 2.2% of copper, 0.8% of magnesium, 1.3% of nickel, 0.4% of iron, 0.2% of manganese, 0.1% of titanium, the remainder being aluminium.

The deposition was effected by argon-arc welding with the use of an iron-base surfacing material which was applied in the form of 1.2 mm solid wire comprising the following ingredients by weight: 0.1% of carbon, 1.9% of manganese, 0.8% of silicon, with the balance being iron.

The weld penetration for a piston of the above type was to be 4-5 mm.

The welding material was added under the following operating conditions:
Welding arc heat output: $0.7 \times 10^4$ W/sq cm
(welding current = a.c. 500 A, 50 Hz, arc stream voltage = 15-18 V)
Tungsten electrode dia: 8 mm
Consumption of the shielding gas: 10 l per min
Speed of deposition: 180 m per h
Speed of wire feeding: 190 m.p.h.

The above operating conditions made it possible to add to the deposited metal 50 weight percent of alloying elements, with the base material of the deposited metal being intermetallic compound iron/aluminium having an elevated brittleness. It should also be noted that the said intermetallic compound is formed by solving aluminium-base alloy in a molten iron-base surfacing material at a temperature of about 1500° C.

The intermetallic compound thus formed was diluted in aluminium alloy, which was effected by that the deposited metal was remelted with the weld pool volume being increased 7 times, and the speed of deposition being decreased from 180 m.p.h. to 54 m.p.h. Thereafter the deposited material was remelted again with the weld pool volume increased 4 times, and the speed of deposition decreased from 54 m.p.h. to 36 m.p.h.

The thus deposited metal had the following ingredients (by weight) 11.6% of silicon, 5.3% of iron, 2.1% of copper, 0.76% of magnesium, 1.21% of nickel, 0.21% of manganese, 0.08% of titanium, the balance being aluminium.

The deposited metal was tested for impact toughness, tensile strength, and Brinell hardness. The test results are given below.
Tensile strength, MPa: 180
Brinell hardness, HB:
  at a temperature 20° C.: 125
  at a temperature 250° C.: 80
Notch toughness, MJ/m$^2$: 0.1

The resulting deposited metal was subjected to a metallographic investigation which showed that said metal had an intermetallic compound-reinforced heterphase composite structure, which ensured a high elasticity modulus of the deposited material, which modulus was close to the elasticity modulus of the pig iron. The deposited metal in the zone of the first compression ring was tested directly on the engine. The test results has shown that the wear resistance of the said pistons was 4 times higher than that of the pistons which were not strengthened in the same way. There were also conducted comparison tests of a piston strengthened with a deposited metal and of the piston provided with an insert of "niresist" iron. The tests showed that the wear resistance of the pistons having metal deposit was by 10 to 20% higher than that of the pistons provided with inserts of pig-iron "niresist".

EXAMPLE 2

The proposed method was carried out in the following manner.

A wear-resistant layer was deposited onto the joint plane of an automobile engine block head made from a casting aluminium-base alloy comprising the following ingredients (by weight): 8.7% of silicon, 0.2% of manganese, 0.03% of nickel, 0.03% of titanium, 0.3% of magnesium, 0.6% of iron, 0.1% of copper, the remainder being aluminium.

The deposition was effected by means of a laser beam applying argon-shielded welding process with the use of surfacing material in the form of a manganese-base alloying powder containing, by weight, 10.8% of iron, 15.6% of chromium, 20.3% of silicon, the balance being manganese.

The said welding material was added under the following operating conditions:
Laser beam heat output: $10^3$ W/cm$^2$
Laser beam operating diameter: 2 mm
Consumption of argon: 4-6 l/min
Speed of deposition: 80 m.p.h.

The above operating conditions made it possible to add to the metal being deposited 20 weight percent of the manganese-base alloying material, with the alloying elements contained in the deposited metal in the form of large intermetallic bodies.

To provide for a uniform distribution of the alloying elements in the deposited metal the latter was remelted, with the weld pool volume being increased 10 times, which was accomplished by decreasing the speed of deposition from 80 m.p.h. to 10 m.p.h.

The thus deposited metal was composed, by weight, of 8.6% of silicon, 3.3% of manganese, 0.03% of nickel, 0.02% of titanium, 0.2% of magnesium, 0.6% of iron, 0.1% of copper, 0.8% of chromium, the balance being aluminium.

The deposited metal was tested for notch toughness, tensile strength, and Brinell hardness. The results of the test are given below.
Tensile strength, MPa: 200
Brinell hardness, HB: 120
Notch toughness, MJ/m$^2$: 0.1

The resulting deposited metal was subjected to a metallographic investigation which showed that said metal had a composite heterophase structure reinforced by a manganese and chromium-base intermetallic fabric.

There were also conducted comparison tests of an automobile engine block head strengthened with a wear resistant metal in the zone of the exhaust outlets and of a cylinder block head without a such deposition of a wear-resistant metal. The tests which were conducted on an operating engine showed that the heat-resistance of the strengthened cylinder block head was two times higher than that of the head without such strengthening which allows the service life of an engine to be increased 2 times.

EXAMPLE 3

The proposed method was carried out as herein disclosed.

A wear-resistant layer was deposited in the first compression ring zone of an internal combustion engine piston having a diameter of 100 mm. The piston was manufactured from casting aluminium containing, by weight, 12.1% of silicon, 1.6% of copper, 0.8% of magnesium, 1.4% of nickel, 0.5% of iron, 0.1% of manganese, 0.03% of titanium, and the remainder being aluminium.

The deposition of metal was effected by an electron beam spray coating with the use of a nickel-base surfacing material, in a vacuum of about $10^{-4}$ mercury column applying a plasma welding technique, whereafter a wear-resistant layer was melted. To this end the coated surface of the piston was exposed to an electron beam having a heat output of $10^5$ W/cm$^2$ and a diameter of 10 mm, with the speed of deposition being 220 m.p.h.

These operating conditions allowed 98 weight % of nickel to be added to the deposited metal.

To provide for a uniform distribution of alloying elements the deposited metal was remelted, with the volume of the weld pool being increased 6 times, which was accomplished by decreasing the speed of deposition from 220 m.p.h. to 80 m.p.h. The resulting deposited metal was remelted again, with the volume of the weld pool being increased 7 times, and the speed of deposition further decreased from 80 m.p.h to 25 m.p.h.

The metal thus deposited contained the following ingredients, by weight: 11.9% of silicon, 7.0% of nickel, 1.1% of copper, 0.8% of magnesium, 0.4% of iron, 0.1% of manganese, 0.03% of titanium, the balance being aluminium.

The deposited metal was tested for notch toughness, tensile strength and Brinell hardness. The test results are given below.
Tensile strength, MPa: 210
Brinell hardness, HB: 130
Notch toughness, MJ/m$^2$: 0.1

The comparison test of the piston strengthened with a metal deposited in the zone of the first compression ring and the piston having an insert of pig iron "niresist" in the same zone directly on the engine showed that the wear-resistance of the pistons strengthened with deposited metal increased 1.2 times.

EXAMPLE 4

The proposed method was carried out as herein disclosed.

A wear-resistant layer was deposited on a 110 mm piston of an internal combustion engine in the zone of the inner chamber edge. The said piston was made of casting aluminium comprising, by weight, 12.1% of silicon, 2.2% of copper, 0.8% of magnesium, 1.3% of nickel, 0.4% of iron, 0.2% of manganese, 0.1% of titanium, the balance being aluminium.

The deposition of metal was carried out by applying plasma welding process with the use of argon as a plasma-forming gas and a surfacing material in the form of powdered alloying material comprising, by weight, 20.0% of iron, 4.0% of cobalt, 10.0% of chromium, 5.0% of manganese, 20.0% of silicon, 2.0% of vanadium, the balance being aluminium.

The alloying element was added to the deposited metal under the following operating conditions:
Plasma heat source heat output: $10^4$ W/cm$^2$
Welding current: 260 A, a.c., 50 Hz
Arc stream voltage: 15–18 V
Tungsten electrode diameter: 5 mm
Consumption of the shielding gas: 6 l/min
Speed of deposition: 150 m.p.h.

The above operating conditions allowed 20% by weight of alloying elements to be added to the deposited metal, with the alloying elements being present in the deposited metal in the form of separate brittle composite intermetallic bodies.

To uniformly distribute the alloying elements in the deposited material the latter was remelted, with the welding pool volume being increased 1.2 times, which was accomplished by decreasing the speed of deposition from 20 to 16 m.p.h.

The resulting deposited metal was composed, by weight, of 11.9% of silicon, 7.0% of nickel, 1.6% of copper, 0.8% of magnesium, 0.4% of iron, 0.1% of manganese, and 0.03% of titanium.

The deposited metal was tested for notch toughness, tensile strength, and Brinell hardness. The test results are given below.
Tensile strength, MPa: 210
Brinell hardness, HB: 130
Notch toughness, MJ/m$^2$: 0.1

The metal thus deposited was subjected to metallographic investigation which showed that said metal had a fine-grained composite structure with a dendritic intermetallic matrix.

For the purpose of comparison two pistons were tested directly on an engine in operation, one piston being strengthened with deposited metal, and the other one was not strengthened likewise. The test showed that the thermocyclic strength of the edges of the pistons strengthened with a deposited metal was by 50% higher than that of the pistons which were not strengthened.

EXAMPLE 5

The proposed method was carried out in the following manner.

A wear-resistant layer was deposited on a 130 mm piston of an internal combustion engine in the zone of the first compression ring. The piston was made of casting aluminium comprising the following ingredients (by weight): 20.0% of silicon, 0.3% of manganese, 1.5% of nickel, 0.2% of titanium, 0.5% of magnesium, 1.3% of iron, 3.0% of copper.

The deposition of metal was effected by applying argon-arc welding process with the use of an iron-base surfacing material which was used in the form of 1.6 mm powder-core wire having an iron sheath.

The said iron sheath was composed, by weight, of 0.1% of carbon, 1.9% of manganese, 0.8% of silicon, the remainder being iron. The core flux had the following ingredients (by weight): 25.0% of chromium, 12.0% of molibdenum, 13.0% of vanadium, 20.0% of titanium, 13.0% of cobalt, the balance being silicon.

The surfacing material was added under the following operating conditions:
Welding arc heat output: $0.8 \times 10$ W/cm$^2$ Welding current: 600 A, a.c., 50 Hz
Arc stream voltage: 18–20 V
Diameter of the tungsten electrode used: 10 mm
Consumption of the shielding gas: 10 l/min
Speed of deposition: 180 m.p.h.
Speed of wire feeding: 180 m.p.h.

The amount of alloying elements which was possible to add under the above operating conditions constituted 30 wght %, the base of the deposited metal being an intermetallic composition of the alloying elements and aluminium.

To dissolve the resulting intermetallic compound in the base metal the deposited metal was remelted, with the weld pool volume being increased 7.5 times, which was accomplished by decreasing the speed of deposition from 180 to 45 m.p.h. The thus obtained deposited metal was remelted again with the weld pool volume being increased 5 times, and the speed of deposition decreased from 45 to 28 m.p.h.

The metal thus deposited comprised, by weight, 19.0% of silicon, 0.3% of manganese, 1.4% of nickel, 0.21% of titanium, 0.5% of magnesium, 5.0% of iron, 2.8% of copper, 0.2% of chromium, 0.1% of molibdenum, 0.1% of vanadium, 0.1% of cobalt.

The deposited metal was tested for notch toughness, tensile strength, and Brinell hardness. The test results are given below:
Tensile strength, MPa: 220
Brinell hardness, HB: 135
Notch toughness, MJ/m$^2$: 0,1

The comparison test of the piston reinforced with a deposited metal and the piston which was not reinforced showed that the wear resistance of the first one was 1.5 times higher than that of the second one.

EXAMPLE 6

The proposed method was carried out as herein disclosed.

A wear-resistant layer was deposited on the piston of an internal combustion engine in the zone of the first compression ring, the diameter of the piston being 120 mm. The piston was made from aluminium alloy containing, by weight, 0.1% of silicon, 0.04% of manganese, 0.9% of nickel, 0.04% of titanium, 1.4% of magnesium, 0.9% of iron, 2.0% of copper.

The deposition of metal was effected by applying plasma welding technique with the use of argon as a plasma-forming and shielding gas. As a surfacing material use was made of a composite 2 mm wire consisting of an iron (50 wght %) and nickel (50 wght %)—base core and aluminium sheath.

The surfacing material was introduced under the following operating conditions:
Heat output of the plasma heat source: $0.7 \times 10^4$ W/cm$^2$
Welding current: a.c. 500 A, 50 Hz
Arc stream voltage: 16–17 V
Diameter of the tungsten electrode used: 8 mm
Consumption of the shielding gas: 9 l/min
Speed of deposition: 200 m.p.h.
Speed of wire feeding: 280 m.p.h.

The above operating conditions allowed 60 wght % of alloying elements to be added, with the base of the deposited metal being intermetallic inclusion iron/nickel/aluminium having an elevated brittleness.

The resulting intermetallic compound was dissolved in aluminium-base alloy to produce an intermetallic composition having an elevated stability and strength. This was achieved by that the deposited metal was remelted with the weld pool volume being increased 9 times and the speed of deposition being reduced from 200 to 30 m.p.h.

The metal thus deposited contained, by weight, 0.1% of silicon, 0.03% of manganese, 3.4% of nickel, 0.04% of titanium, 1.4% of magnesium, 3.5% of iron, and 2.0% of copper, the balance being aluminium.

The deposited metal was then tested for notch toughness, tensile strength, and Brinell hardness. The test results are given below:
Tensile strength, MPa: 250
Brinell hardness, HB: 140
Notch toughness, MJ/m$^2$: 1.2

The comparison test of the piston strengthened with a deposited metal and of a piston which was not strengthened showed that the wear resistance of the strengthened piston was 5 times higher than that of the piston which was not strengthened.

EXAMPLE 7 (NEGATIVE)

The proposed method was carried out in general as described in Example 2.

However, the amount of an alloying element added to the deposited metal constituted 15 wght percent. In this case the alloying elements were present in the deposited material both in the form of separate intermetallic inclusions and unmelted particles. Therefore, it was no use continuing the process since otherwise there would occur non-uniform distribution of the alloying elements and which would result in an elevated brittleness of the deposited layer.

EXAMPLE 8 (NEGATIVE)

The proposed method was carried out in general as described in Example 3.

This time, however, the spray-coated surface of the piston was remelted with the aid of an electron beam having heat output of $10^6$ W/cm$^2$.

Increase in the heat output of the heat source to a level higher than the recommended upper limit thereof caused more intensive evaporation of the molten metal which leads to the loss of the alloying elements in the deposited layer and affects the process of tormation thereof, as well as to the formation of deposit on the peepholes of the vacuum chamber.

EXAMPLE 9 (NEGATIVE)

The proposed method was carried out in a similar way as in Example 1.

The heat output of the welding arc was $0.8.10^3$ W/cm$^2$ that is lower than the recommended lower limit thereof, which was not sufficient to melt down the melting material and therefore did not allow the process to be continued.

EXAMPLE 10 (NEGATIVE)

The proposed method was carried out in general as described in Example 1, except that the metal deposition was effected with the weld pool volume being increased 12 times. This resulted in that the alloying elements formed in the deposited layer large separate brittle intermetallic inclusions which caused a sharp decrease in the notch toughness of the deposited layer of metal. The further remelting of the weld pool did not eliminate this defect, as the temperature of the weld pool in this case could not be raised higher than 900° C., while the said intermetallic inclusions had a melting point in the range of from 1300° to 1400° C.

While particular embodiments of the invention have been described, various modifications thereof will be apparent to those skilled in the art and therefore it is not intended that the invention be limited to the disclosed embodiments or to the details thereof and the departures may be made therefrom within the spirit and scope of the invention as defined in the claims.

We claim:

1. A method of depositing a layer of a metal other than aluminum onto an aluminum-based alloy, comprising:
   (a) introducing into a weld pool about 20 to 98% by weight of a surfacing material based on alloying elements;
   (b) depositing said surfacing material onto said aluminum-based alloy from said weld pool using a heat source having a heat output from $10^3$ to $10^5$ W/cm$^2$; and
   (c) remelting the deposited surfacing material while increasing the volume of the weld pool 1.2 to 10 times each time the deposited surfacing material is remelted.

2. The method of claim 1 in which the alloy element has a higher melting point than aluminum.

3. The method of claim 1 in which the alloy element is iron, nickel, cobalt, manganese or chromium.

4. The method of claim 1 in which the remelting of the deposited surfacing material is accomplished without addition of surfacing material to the weld pool.

5. The method of claim 1 in which the volume of the weld pool is increased by decreasing the speed of deposition of the surfacing material.

* * * * *